Feb. 26, 1929.  S. B. HASELTINE  1,703,271
FRICTION SHOCK ABSORBING MECHANISM
Original Filed July 23, 1927  2 Sheets-Sheet 2
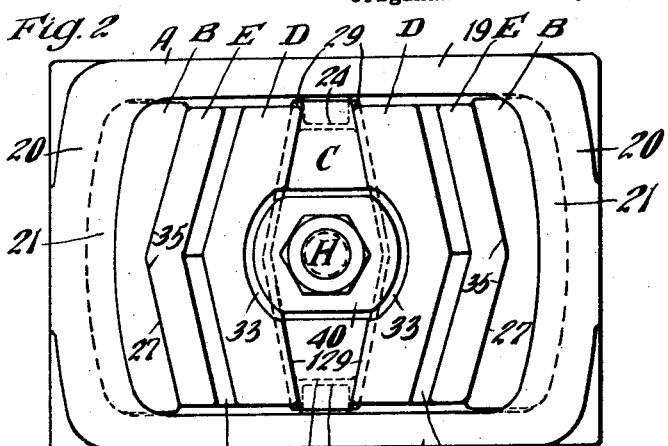
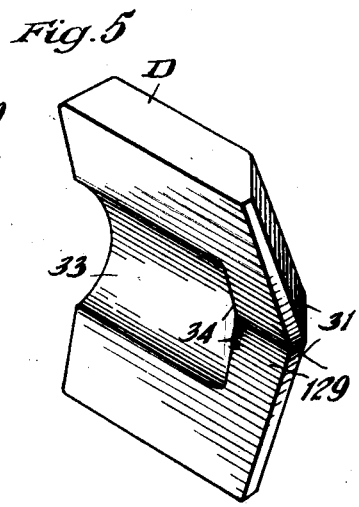
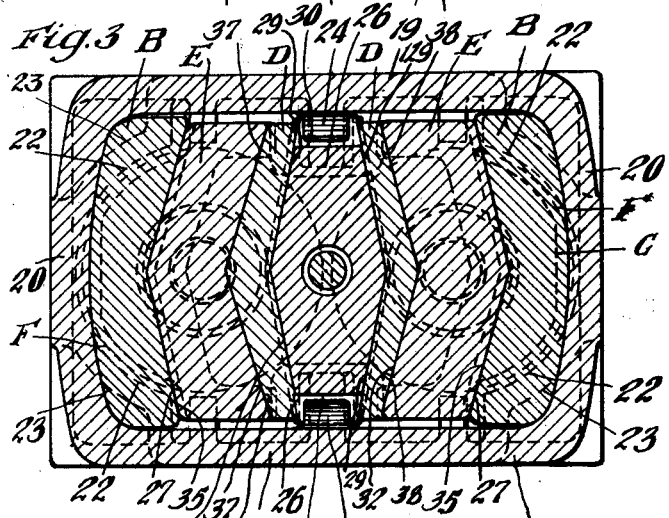
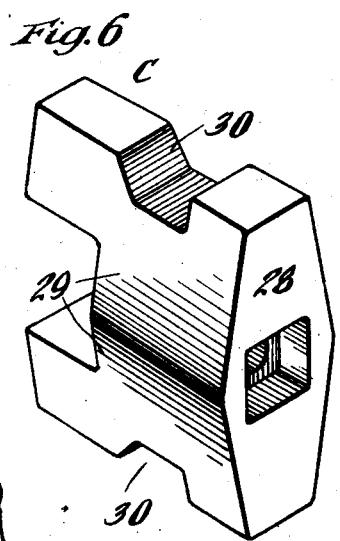
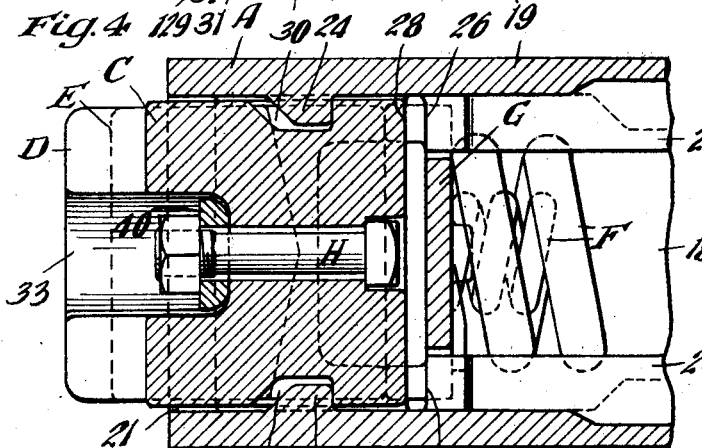
Inventor
Stacy B. Haseltine Patented Feb. 26, 1929.

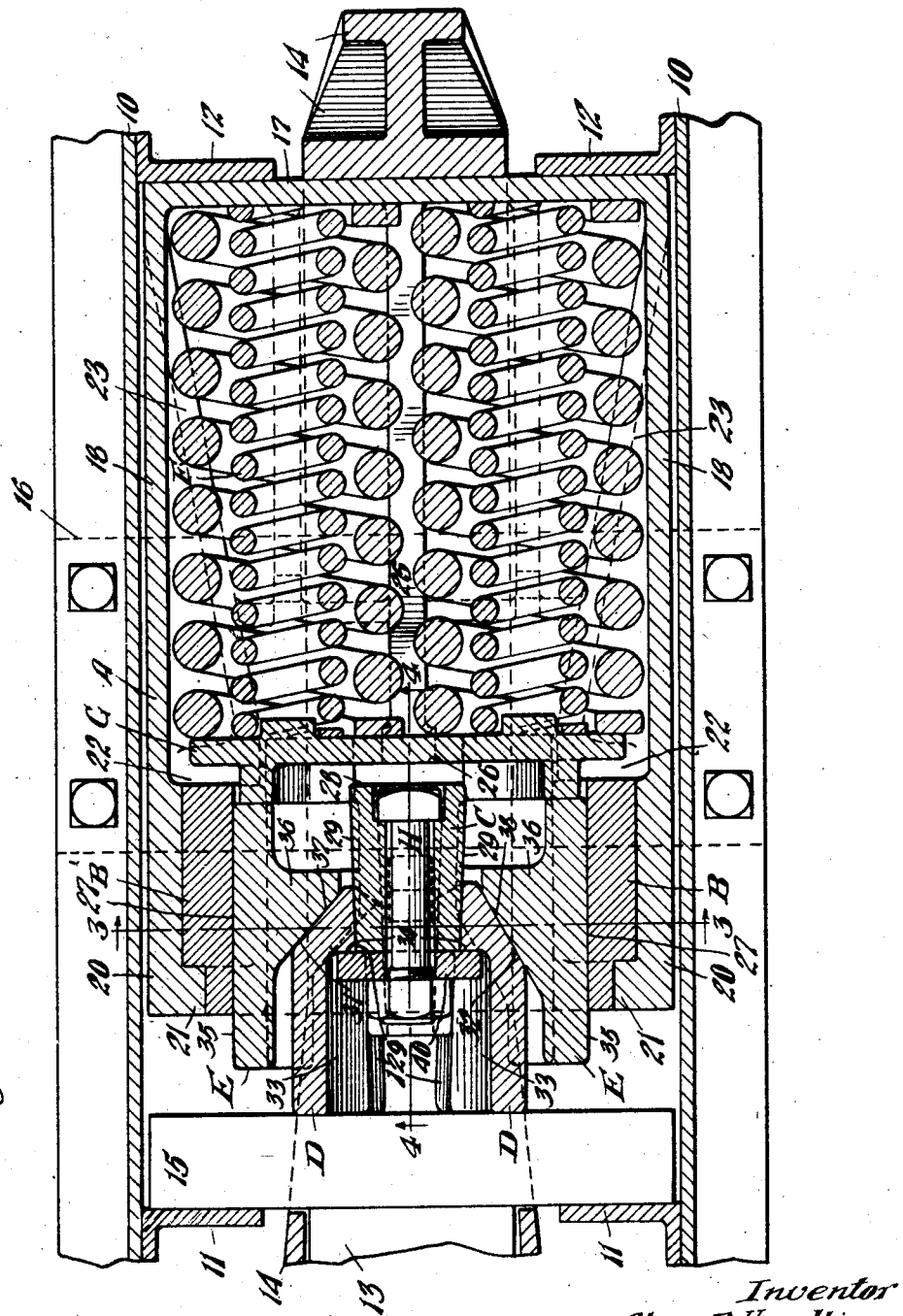

1,703,271

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed July 23, 1927, Serial No. 207,910. Renewed August 11, 1928.

This invention relates to improvements in friction shock absorbing mechanisms.

One object of the invention is to provide a friction shock absorbing mechanism, especially adapted for railway draft riggings including a friction shell, a central friction post, and friction wedge means cooperating with the post and shell wherein the cooperating friction surfaces of the friction post and friction wedge means and the cooperating friction surfaces of the friction wedge means and shell interengage to restrict relative movement of the parts to a direction longitudinal of the mechanism, thereby holding the friction means free of the inactive shell walls to prevent wear of the latter.

Another object of the invention is to provide a friction shock absorbing mechanism of the character indicated including a friction shell having a set of opposed walls presenting interior friction surfaces, and a set of additional opposed walls, a central friction post, friction shoes cooperating with the friction surfaces of the shell, wedge means having frictional engagement with the post and relative movement thereto, the wedge means having wedging engagement with the shoes, wherein all of the cooperating friction surfaces and cooperating wedge faces interengage to limit movement of the parts to a direction longitudinally of the shell and thus maintain the entire friction means out of contact with the additional shell walls to prevent wear of the latter and prolong the life of the gear.

A still further object of the invention is to provide in a friction shock absorbing mechanism, including a friction shell, a friction post and friction means comprising wedge blocks and friction shoes, cooperating with the post and shell, wherein simple and efficient means is provided for holding the post and wedge means assembled with the friction shell.

Other objects of the invention will more clearly appear from the description and claims hereinafter following.

In the drawings forming a part of this specification, Figure 1 is a horizontal, longitudinal, sectional view of a portion of a railway draft rigging illustrating my improvements in connection therewith. Figure 2 is a front end elevational view of the shock absorbing mechanism proper. Figure 3 is a vertical, transverse, sectional view, corresponding substantially to the line 3—3 of Figure 1. Figure 4 is a longitudinal, vertical, sectional view of the forward end portion of the shock absorbing mechanism proper, corresponding substantially to the line 4—4 of Figure 1. And Figures 5 and 6 are detail perspective views, respectively, of a wedge block and the friction post employed in connection with my improved mechanism.

In said drawings, 10—10 indicate channel shaped center or draft sills of a railway car underframe, to the inner sides of which are secured the usual front stop lugs 11—11 and rear stop lugs 12—12. The rear end portion of the draw bar is designated by 13, to which is operatively connected a yoke 14 of well known form. The shock absorbing mechanism proper and a front main follower 15 are disposed within the yoke. The yoke and the parts therewithin are supported in operative position by a saddle plate 16 detachably secured to the draft sills 10—10.

My improved shock absorbing mechanism proper, comprises broadly a casing A; a pair of liners B—B; a friction post C; two wedge blocks D—D; two friction shoes E—E; a main spring resistance F; a main spring follower G; and a retainer bolt H.

The casing A is in the form of a substantially rectangular box-like casting, open at the forward end and having a transverse rear end wall 17 cooperating with the stop lugs 12 in the manner of the usual rear follower. The casing is provided with longitudinally extending vertically disposed spaced side walls 18—18 and horizontally disposed spaced top and bottom walls 19—19. The side walls 18 are thickened at the forward ends, as indicated at 20, the thickened portions being recessed inwardly of the front end of the casing A, thereby providing inwardly projecting ribs 21—21 at the open end of the casing. At the four corners of the casing immediately adjacent the thickened portions 20 of the side walls, shoulders 22—22 are provided, the shoulders being reinforced by bracing sections 23 extending rearwardly of the casing. At the forward end the top and bottom walls of the casing A are provided with inwardly projecting stop lugs 24—24. As most clearly shown in Figure 4, the lugs 24 are spaced an appreciable distance inwardly from the front end of the casing A. The top and bottom walls 19 of the casing are also provided with longitudinally extending inwardly projecting heavy ribs 25—25 presenting flat transverse abutment faces 26 at the forward end thereof adapted to cooperate with the inner end of the post C to limit the movement of the latter. In addition to serving as stop means for the post the ribs 25 also function as spacing means for the twin arranged spring resistance F.

The liners B, which are of similar design, are detachably anchored to the side walls of the casing A. Each liner B is provided with a friction surface 27 on the inner side thereof of substantially V-shaped section. On the outer side the forward end portion of each liner B is cut away to fit the rib 21 on the corresponding side wall of the casing. The length of the main body portion of each liner B is such as to fit snugly between the rib 21 and the shoulders or abutment faces 22 at the same side of the casing. It will be evident that the ribs 21 together with the abutments 22 positively hold the liners against movement longitudinally of the casing A.

The friction post C is disposed centrally of the casing A and has a flat rear end face 28 normally spaced from the abutment faces 26. On the opposite sides the post C is provided with friction surfaces 29—29 diverging inwardly of the mechanism. The friction surfaces 29, as most clearly illustrated in Figures 2, 3 and 6, are of V-shaped section so as to properly cooperate with the wedge blocks D to prevent relative vertical displacement of these parts. The top and bottom sides of the post C are notched, as indicated at 30, to receive the lugs 24 of the top and bottom walls of the casing. As most clearly illustrated in Figure 4, clearance is provided between the walls of the notches 30 and the faces of the lugs 24 to permit the required inward movement of the post C so that the same will engage with the abutment faces 26 of the ribs 25. Outward movement of the post C is positively limited by engagement of the lugs 24 with the rear end walls of the notches 30 of the post.

The wedge blocks D are of similar design, except as hereinafter pointed out, and are disposed at opposite sides of the post C. Each of the wedge blocks D has a flat front end face bearing directly on the main follower 15. At the inner end each wedge block is provided with a wedge face cooperating with one of the friction shoes, the wedge face of one of the blocks being designated by 31 and that of the other block being designated by 32. As clearly illustrated in Figure 1, the wedge face 31 is disposed at a relatively blunt angle with respect to the longitudinal axis of the mechanism, while the wedge face 32 is disposed at a keen wedge-acting angle with respect to said axis. The wedge faces 31 and 32 are of V-shaped section, as clearly illustrated in Figures 1 and 5, so as to cooperate with the friction shoes E to prevent relative vertical displacement of these parts. On the inner side each wedge block D is cut away, as indicated at 33, thereby providing a transverse abutment shoulder 34 adjacent the rear end thereof. The abutment shoulders 34 of the two wedge blocks D cooperate with retaining means for limiting outward movement of the wedge blocks as hereinafter pointed out.

The friction shoes E—E, which are of similar design, except as hereinafter pointed out, are interposed between the wedge blocks D and the liners B. Each of the friction shoes E is provided with an outer friction surface 35 adapted to cooperate with the friction surfaces 27 of the corresponding liner B. The friction surfaces 35 of the shoes are of V-shaped section so as to interfit with the V-shaped friction surfaces 27 and prevent vertical displacement of the friction shoes with respect to the liners B. On the inner side, each shoe E has a lateral enlargement 36 provided with a wedge face at the forward side thereof. The wedge face of one of the shoes is disposed at a relatively blunt angle with respect to the longitudinal axis of the mechanism, the same being designated at 37. The wedge face 37 cooperates with the wedge face 31 of the wedge block D and is of V-shaped section so as to interfit with the wedge face 31. The wedge face of the remaining shoe is designated by 38 and cooperates with the wedge face 32 of the wedge block D. The wedge face 38 is correspondingly inclined to the wedge face 32 and is of V-shaped section so as to interfit with the wedge face 32 and prevent relative vertical displacement of the friction shoe E referred to and the wedge block D cooperating therewith.

The main spring resistance comprises twin arranged members, each including an inner coil and a relatively heavier outer coil. The opposite ends of the main spring resistance F bear respectively on the end wall 17 of the casing A and on the spring follower G. The spring follower G is interposed between the inner ends of the friction shoes E and the main spring resistance F and has forwardly extending flange-like portions which bear directly on the inner ends of the shoes E and maintain the main body portion of the spring follower G normally spaced from the inner ends of the liners B. When the mechanism is assembled, the main spring resistance F is placed under initial compression so that the spring follower G will be urged outwardly. Due to the tendency of the spring F to expand, the spring follower G will maintain the friction and wedge faces of the mechanism in contact, thereby compensating for wear of these parts.

The wedge blocks D are anchored to the friction post C by the retainer bolt H, the post C being provided with a bore adapted to receive the shank of the bolt H, the head of the bolt being accommodated in a recess at the rear end of the post. As most clearly shown in Figures 1 and 4, the head of the bolt is of square section and the opening which accommodates the head is also of square section so that turning movement of the bolt is prevented when the head is seated in the recess of the post. A washer or anchoring plate 40 is interposed between the nut of the bolt and the front end of the post C, the retainer washer or plate projecting laterally beyond the opposite sides of the post in overhanging relation to the abutments 34 on the wedge blocks D. When the parts are assembled, the retainer plate 40 which is held by the anchoring bolt H limits outward movement of the wedge blocks D by engagement with the shoulders 34 of the blocks.

In assembling the mechanism, the main spring resistance means F and the spring follower G are first inserted within the casing A. The liners B are next placed in position. The friction post is then inserted between the abutment shoulders 26 and the lugs 24. After the friction shoes E and the wedge blocks D have been placed in position, the retainer plate 40 is placed on the bolt H and secured by the nut of the bolt. Inasmuch as the plate 40 overhangs the shoulders 34 of the wedge blocks D, as hereinbefore pointed out, the parts are held completely assembled by the retainer bolt H, movement of which outwardly of the mechanism is restricted by engagement with the post C.

The operation of my improved shock absorbing mechanism, assuming a compression stroke is as follows: The main follower 15 and the casing A will be moved relatively toward each other, thereby forcing the wedge blocks D inwardly of the mechanism and setting up a wedging action between the keen wedge faces 32 and 38. Due to the wedging action, the friction shoes E will be forced into intimate contact with the friction surfaces of the liners and the friction surfaces of the wedge blocks will be forced into intimate contact with the friction surfaces of the post C. As the compression of the mechanism progresses the friction post C will be carried inwardly with the wedge blocks D until movement of the post is limited by engagement with the abutment shoulders or faces 26 of the ribs 25. Upon movement of the post being arrested the wedge blocks D will be forced to slide on the friction surfaces of the post. At the same time the friction shoes will also slide on the friction surfaces of the liners B resisted by the main spring F. Inasmuch as the friction post C is provided with inwardly diverging friction surfaces, the wedge blocks D will be forced apart. This lateral movement of the wedge blocks is accommodated by the cooperating blunt wedge faces 31 and 37. It is also pointed out that the necessary lateral displacement of the post C is permitted due to the same being free to move laterally between the shoulders or abutment faces 26 of the ribs 25 and the lugs 24. The described action of the mechanism will continue either until the actuating force is reduced or the main follower 15 comes into engagement with the front end of the casing A. Upon engagement of the follower with the casing, the actuating force is transmitted directly through the casing, the latter acting as a solid column load transmitting member to prevent the springs from being unduly compressed.

Upon release of the mechanism when the actuating force is reduced, the expansive action of the spring resistance F forces all the parts outwardly, the spring follower G carrying the friction shoes E—E outwardly. During the first part of the releasing action, the post C will also be carried outwardly in unison with the remaining friction members, inasmuch as the post is moved inwardly away from the lugs 24 during the initial compression of the mechanism. The friction means including the post C is moved outwardly in unison until movement of the post is positively arrested by engagement with the lugs 24. During the remainder of the releasing action the friction shoes E and the wedge blocks D are carried outwardly with respect to the post C until movement of the wedge blocks D is limited by engagement of the shoulders 34 thereof with the retainer plate 40.

From the preceding description taken in connection with the drawings, it will be evident that I have provided an exceedingly simple and efficient shock absorbing mechanism of the friction shell type, wherein a plurality of friction elements are employed cooperating with the friction post to augment the friction resistance of the gear and wherein the friction and wedge faces of the friction means are so arranged as to cooperate to prevent displacement of the parts of the friction system relatively to each other and hold the same out of engagement with the inactive surfaces of the walls of the shell, thereby preventing wear of the shell proper and greatly prolong the life of the same.

While I have herein shown and described the preferred manner of carrying out my invention, the same is merely illustrative, and I contemplate all changes and modifications which come within the scope of the claims appended hereto.

I claim:

1. In a friction shock absorbing mechanism, the combination with a friction casing having opposed interior friction surfaces; of a central friction post; wedge pressure transmitting blocks disposed on opposite sides of the post and having frictional engagement therewith, said blocks being movable relatively to the post; friction shoes having friction surfaces cooperating with said shell friction surfaces, the cooperating friction surfaces of the shoes and shell interengaging to limit relative movement thereof to a direction longitudinal of the mechanism, said shoes and wedge blocks having wedge faces limiting relative movement thereof to a direction longitudinal of the mechanism, and said wedge block and friction post having friction surfaces limiting relative movement thereof to a direction longitudinal of the mechanism; and spring means opposing inward movement of the shoes.

2. In a friction shock absorbing mechanism, the combination with a casing; of a central friction post having inwardly diverging friction surfaces on the opposite sides thereof; a pair of wedge blocks disposed on opposite sides of the post and movable relatively thereto, said wedge blocks and post having interengaging cooperating friction surfaces limiting the relative movement of the post and wedge blocks to a direction longitudinal of the mechanism; friction shoes cooperating with the friction shell, said shell and shoes having interengaging friction surfaces limiting relative movement of the shoes and shell to a direction longitudinal of the mechanism, said shoes and wedge blocks having cooperating wedge faces limiting relative movement of the shoes and blocks to a direction longitudinal of the mechanism; and means yieldingly opposing inward movement of the shoes.

3. In a friction shock absorbing mechanism, the combination with a rectangular casing having friction surfaces on the interior thereof, said surfaces being of V-shaped section; of friction shoes cooperating with the shell, said shoes having V-shaped friction surfaces engaging the V-shaped surfaces of the shell; wedge blocks having V-shaped wedge faces engaging similar V-shaped wedge faces on the shoes; a central friction post interposed between said wedge blocks, said post and wedge blocks having interengaging V-shaped friction surfaces, and said wedge blocks being movable longitudinally of the mechanism with respect to the post; and spring means opposing inward movement of the shoes.

4. In a friction shock absorbing mechanism, the combination with a friction shell; of a friction post having limited movement with respect to the shell; friction shoes cooperating with the shell friction surfaces; wedge blocks engaging the shoes and having frictional contact with the post and being movable relatively thereto; means for limiting outward movement of the wedge blocks including a retainer bolt anchored to the post and retainer means anchored to the bolt having shouldered engagement with the blocks; and spring resistance means opposing inward movement of the friction shoes.

5. In a friction shock absorbing mechanism, the combination with a rectangular casing provided with interior liners at one end thereof, the liners presenting V-shaped friction surfaces; of friction shoes having V-shaped friction surfaces engaging said V-shaped liner friction surfaces; wedge blocks, said wedge blocks and shoes having interengaging V-shaped wedge faces; a central friction post interposed between the wedge blocks, said post and wedge blocks having interengaging V-shaped friction surfaces; and twin spring resistance means within the casing opposing inward movement of the friction shoes.

In witness that I claim the foregoing I have hereunto subscribed my name this 20th day of July, 1927.

STACY B. HASELTINE.